Figure 4:
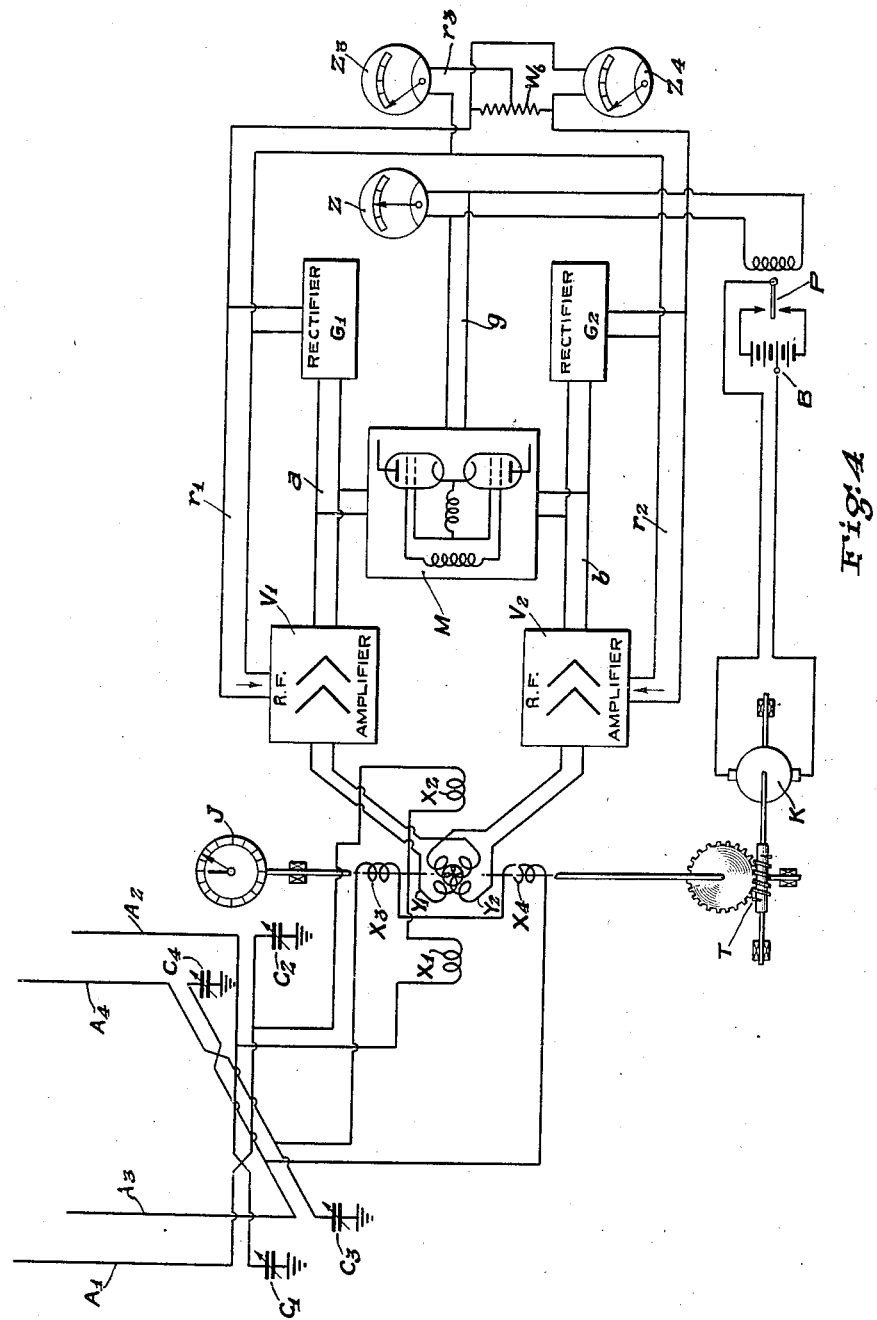

Nov. 18, 1941.　　　G. GUANELLA　　　2,262,931
RADIO DIRECTION FINDER
Filed April 22, 1939　　　3 Sheets-Sheet 1
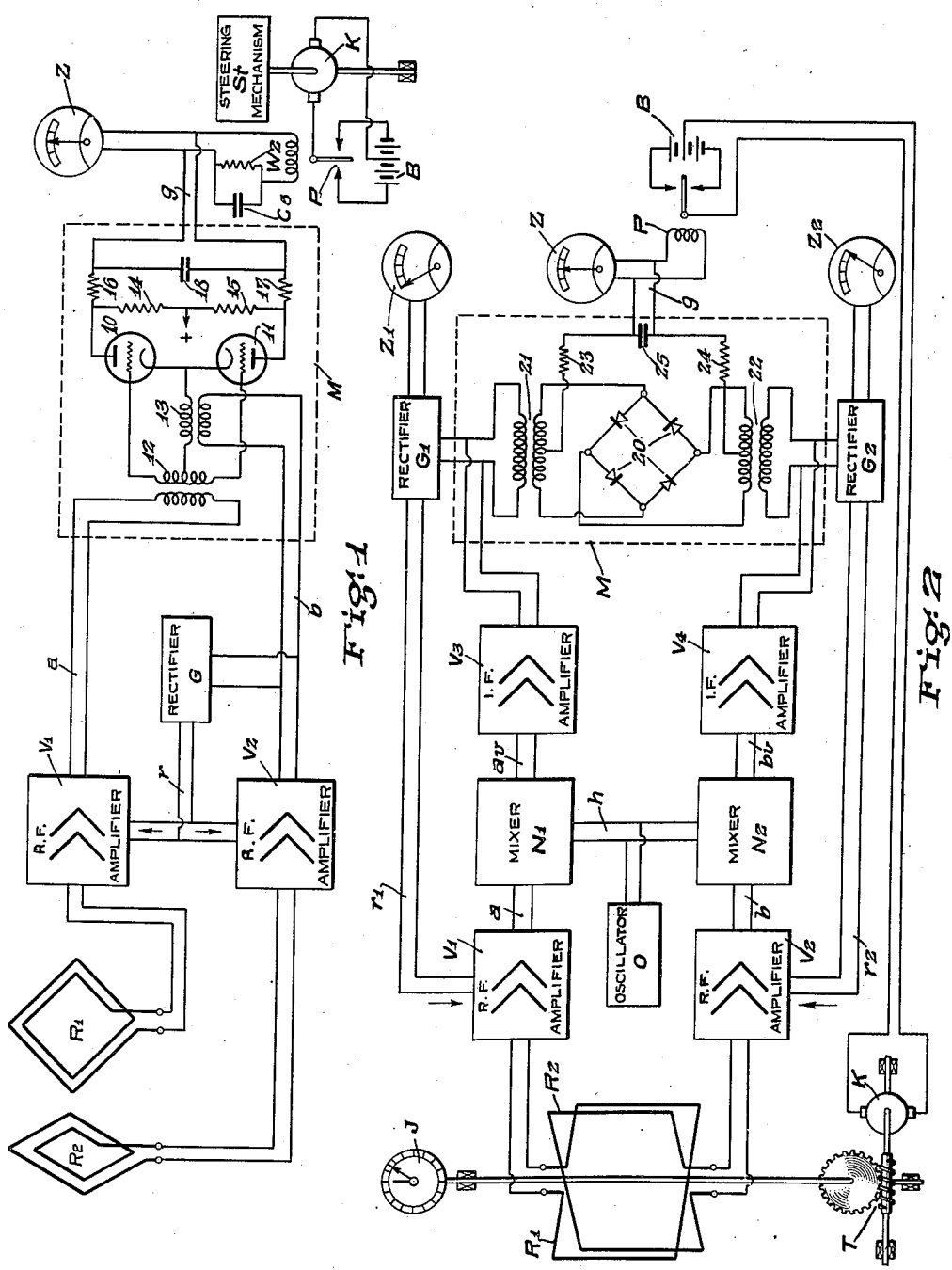
INVENTOR.
Gustav Guanella
BY
ATTORNEY.

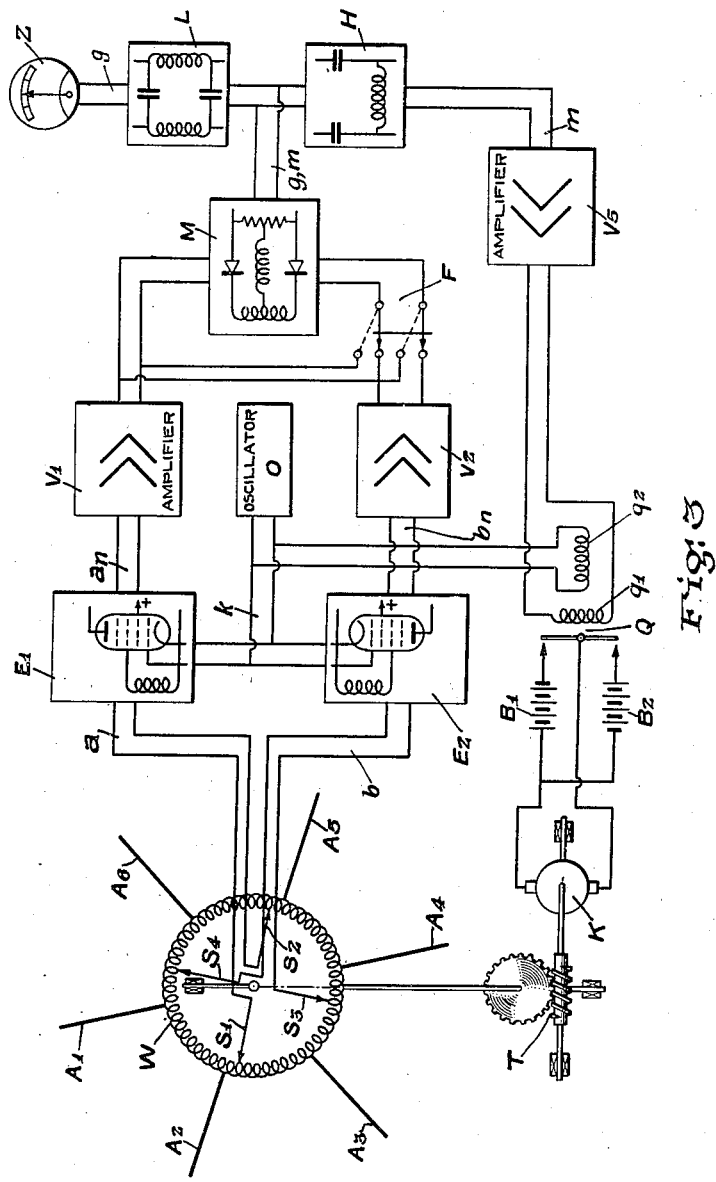

Patented Nov. 18, 1941

2,262,931

UNITED STATES PATENT OFFICE 2,262,931

RADIO DIRECTION FINDER

Gustav Guanella, Zurich, Switzerland, assignor to Radio Patents Corporation, a corporation of New York Application April 22, 1939, Serial No. 269,441
In Switzerland August 23, 1938

18 Claims. (Cl. 250—11)

The present invention relates to apparatus for and a method of determining the direction of propagation of electro-magnetic waves by means of adjustable directional receivers.

In accordance with the hitherto known methods of determining the direction of electromagnetic waves it is customary to use one or more antennae having a directional sensitivity and to adjust a received radio signal to a maximum or minimum by rotation of the directional characteristic. In the operation of arrangements of this type the polarity of small adjusting errors is frequently unknown, wherefore the operation requires a certain skill and experience as well as time for carrying out a bearing determination. Special difficulties are encountered in case of varying direction of the waves being received especially in case of direction finding apparatus mounted on a movable craft such as a ship, airplane or the like.

In order to overcome the above drawbacks it has already been suggested to effect an indication of small deviations of the adjustable directional receiver relative to the incoming signal direction both as to their magnitude and sense. Arrangements of this type are usually based on a comparison of the amplitudes of signals received by a pair of antennae having different directional characteristics. Numerous embodiments of such devices have become known under the designation of "left-right indicators" some of which are also capable of indicating deviations from a predetermined bearing direction both as to magnitude and sense. These known arrangements usually employ means for periodically connecting and disconnecting the receiving antennae. When employing mechanical switching the drawbacks such as lack of reliability, bulk, etc., of mechanical switching devices cannot be avoided. Moreover, when using electrically operated devices such as electronic tubes for effecting the switching operations, the different and varying electrical characteristics of these devices are liable to substantially impair the accuracy of the bearing determination.

By the employment of the method and system proposed by the present invention, the above disadvantages and drawbacks are substantially overcome. The invention, contrary to the known arrangements based upon the comparison and adjustment to equal amplitudes of two received signals, enables the determination of small deviations from the bearing minimum in a most reliable and efficient manner by the utilization of the phase reversal of a received high frequency signal current when passing through its bearing minimum. In carrying out the inventive method there is produced a control magnitude or potential varying in proportion to bearing deviations and serving for either indicating visually small adjusting errors both as to sense and magnitude or for automatically correcting the bearing adjustment.

In the prior art arrangements for indicating deviations from a predetermined direction or course, there is usually provided a directional and non-directional antenna whereby the system is also responsive to interfering waves arriving at right angle to the direction of maximum sensitivity of the directional antenna. For this reason substantial bearing errors may be produced by laterally incoming disturbing waves even though the amplitude of these disturbing waves be small relative to the amplitude of the waves the bearing of which it is desired to determine.

According to the new method proposed by the present invention, two directional antennae, one main and one auxiliary antenna, are employed to produce a control current or potential responsive to bearing deviations both as to sense and magnitude in such a manner that due to the directional sensitivity of the auxiliary directional antenna the effect of laterally incoming disturbing waves is substantially eliminated resulting in a reduction or complete elimination of errors caused by waves having a direction differing from the bearing direction to which the system has been adjusted.

According to the present invention, the indication and/or control of small deviations from the bearing minimum of a first signal derived from a first directional antenna is effected by producing from this signal and from a second also directional signal received by an auxiliary similar directional but differently oriented antenna a control magnitude or potential corresponding to the modulation product of said signals. This control potential varying in proportion to small bearing deviations both as to sense and magnitude is utilized for exactly adjusting the bearing minimum. The auxiliary antenna system for receiving the second signal is preferably of such type and design that the signal received by it assumes a maximum when the signal received by the first antenna system passes through zero. Moreover, the auxiliary antenna has a low directional sensitivity or response to waves arriving in a lateral direction. In this manner the effect of laterally incoming waves on the sensitivity and accuracy of the bearing indication or adjustment is greatly minimized or practically eliminated.

The function and operation of the invention will be further understood by the following theoretical discussion.

Let it be assumed that the directional characteristic of the first antenna system is expressed by the real function $f_1(x)$ whereby the first (main) directional signal $a$ having a frequency $w$ in radians per second and a maximum amplitude $A$ may be expressed by the following theoretical expression as a function of the angle of incidence $x$:

$$a = A.\cos(wt).f_1(x) \qquad (1)$$

The time phase position of this signal is independent of the direction except for a sudden phase reversal by 180° due to the change in polarity of the directional function $f_1(x)$ when passing through zero. The second (auxiliary) directional signal $b$ is derived from a further directional antenna having a directional characteristic $f_2(x)$ such as to assume a maximum when the function $f_1(x)$ passes through zero:

$$b = B.\cos(wt).f_2(x) \qquad (2)$$

The modulation product of the two directional signals $a$ and $b$ will then be as follows:

$$c = 2C.a.b = A \cdot B \cdot C \cdot (1 + \cos 2wt) \cdot f_1(x) \cdot f_2(x) \qquad (3)$$

wherein $C$ is a modulation constant.

The direct current component of $c$ or the resulting directional function $F(x)$ of both antennae combined is then represented by the following expression:

$$g = G.F(x) \qquad (4)$$

wherein for the sake of abbreviation:

$$G = A.B.C \qquad (5)$$

and the resultant directional function $F(x)$ is represented by the following expression:

$$F(x) = f_1(x).f_2(x) \qquad (6)$$

Since the directional function $f_1(x)$ for the bearing direction $x=0$ to be determined undergoes a polarity reversal, the polarity of the control potential $g$ will also be dependent upon the sense of the deviation between the incoming directions of an electro-magnetic wave relative to the directional axis of the first antenna usually assumed as the line at right angles to its direction of maximum sensitivity.

Assuming now that simultaneously with the desired signal there is received a laterally arriving disturbing wave, in the following characterized by the index $s$, at an angle $x_s$, then the modulation product according to Equation 3 will be modified as follows:

$$\begin{aligned} c &= 2C.(a+a_s).(b+b_s) \\ &= A \cdot B \cdot C (1+\cos 2wt) \cdot f_1(x) \cdot f_2(x) \\ &+ A_s \cdot B_s \cdot C (1+\cos 2w_s t) \cdot f_1(x_s) \cdot f_2(x_s) \quad (7) \\ &+ A \cdot B_s \cdot C(\cos(w-w_s)t + \\ &\qquad \cos(w+w_s)t) . f_1(x) . f_2(x_s) \\ &+ A_s \cdot B \cdot C(\cos(w-w_s)t + \\ &\qquad \cos(w+w_s)t) . f_1(x_s) . f_2(x) \end{aligned}$$

The frequency $w_s$ of the disturbing wave is never exactly equal to the receiving frequency $w$; that is, the resulting comparatively low beat frequency $(w-w_s)$ may be suppressed by a simple smoothing filter serving also to suppress the higher frequencies $w$ and $w_s$ as well as the sum frequency $(w+w_s)$ produced by product formation between the desired and disturbing signals. As a result, the D. C. component of the modulation product is composed exclusively of elements originating from the first two members of Expression 7 according to the following:

$$g_1 = G.F(x) + G_s.F(x_s) \qquad (8)$$

On account of the lack of sensitivity of the auxiliary antenna to laterally incoming waves, the directional function $f_2(x)$ or response of this antenna in the direction $x_s$ of the disturbing waves is exceedingly small. For this reason also the second member in Expression 8 may be neglected, resulting in a substantially undisturbed control potential varying according to Equation 4.

The two received signals $a$ and $b$ may for instance be derived from a pair of orthogonal loop antennae having directional characteristics represented in a known manner by the following functions:

$$f_1(x) = \sin x \qquad (9a)$$
$$f_2(x) = \cos x \qquad (9b)$$

In this case the control potential $g$ is represented by the following expression:

$$g = \frac{G}{2} \sin 2x \qquad (10)$$

From the foregoing equation it is seen that the control potential varies both as to sense and magnitude in proportion to small directional or angular deviations $x$ from the minimum bearing adjustment. This dependence of the control potential also holds good if antenna systems are employed having directional characteristics which do not exactly follow a sine law, provided however that the second signal becomes a maximum when the first signal passes through zero.

Since the combined directional characteristic $F(x)$ of the twin-antenna system is determined by the product of the two directional functions $f_1(x)$ and $f_2(x)$ the entire direction finding system may be rendered insensitive to waves having a direction differing from the momentary bearing direction by an angle greater than a predetermined angle by a suitable design of the directional characteristic $f_2(x)$ of the auxiliary antenna. In this case the auxiliary antenna has a pronounced uni-lateral directional characteristic. This possibility of controlling the resultant directional characteristic $F(x)$ of the combined antenna system by selection or variation of the characteristic of the $f_2(x)$ of the second or auxiliary directional antenna constitutes an essential feature and improvement of the invention.

When employing antennae having directional characteristics according to Equations 9a and 9b there are obtained additional bearing minima for deviations $x = \pm 90°$ or $x = 180°$; that is, the control potential $g$ is independent of waves whose direction corresponds to these deviations. The bearing minimum at $x=180°$ is stable; that is, small deviations relative to 180° result in a similar effect as small deviations relative to 0° position. On the other hand, the minimum at 90° is unstable due to the fact that small deviations relative to the 90° position will cause a correction in such a sense as to increase the initial deviation until reaching a stable minimum at 0° or 180°, respectively.

A further characteristic inherent in the inventive method is the fact that the indication of the bearing minimum is not affected by small relative phase shifts of the directional signals. If, for instance, the auxiliary signal is additionally phase shifted relative to the first signal by a small time phase angle caused by slight differences in the receiving and amplifying circuits, then Equation 2 will be as follows:

$$b = B.\cos(wt-y).f_2(x) =$$
$$B(\cos wt.\cos y + \sin wt.\sin y).f_2(x) \quad (11)$$

resulting in a modification of the direct current component $g$ of the modulation product as follows:

$$g = G.F(x).\cos y \quad (12)$$

that is; the control potential $g$ will differ from the value given in Expression 4 merely by the constant value $\cos y$ which itself is only slightly different from 1.

In the ordinary direction finding systems certain difficulties have been experienced in obtaining a sharp bearing minimum due to phase shifted disturbing components in the bearing signals in which case there is no longer obtainable a sharp "null" or zero position. An extremely disadvantageous case exists if the bearing signal is as follows:

$$p = A.\cos(wt).f(x) + D.\sin(wt) \quad (13)$$

that is, if the signal is disturbed by an oscillation of like frequency but relatively phase shifted by 90°, and having an amplitude $D$. Although the resultant amplitude of this high frequency potential $p$ no longer has any "null" or zero amplitude whereby considerable difficulties are encountered in the ordinary operation of a direction finder to obtain bearing minimum, the direct current component or control potential $g$ in the case of the invention will still be determined by the expression according to the Equation 4, if a first directional signal $p$ is received in a system of the invention as represented by Expression 13.

The received signals may be combined with an auxiliary frequency $h = H.\cos(vt)$ before their mutual modulation for changing the signal frequency to an intermediate frequency as is customary in superheterodyne receivers. In this case the two received signals $a$ and $b$, not considering any amplitude change are converted into the sum and difference frequencies as follows:

$$a_v = A.(\cos(w+v)t + \cos(w-v)t).f_1(x) \quad (14)$$
$$b_v = B.(\cos(w+v)t + \cos(w-v)t).f_2(x) \quad (15)$$

By mutual modulation of $a_v$ with $b_v$ there is then again obtained a modulation product having a direct current component or control potential $g$ varying according to Equation 4. Suppression of one of the side bands of the converted signals $a_v$ and $b_v$ will merely result in a decrease of the amplitude of the modulation product.

In certain cases it may be desirable to transmit the modulation product or control potential $g$ in the form of an alternating current. For this purpose the signals $a$ and $b$ may be amplitude modulated in accordance with a low frequency $k = \cos(ut)$ according to the following expressions well understood by those skilled in the art:

$$a_n = A.(1+\cos ut).\cos(wt).f_1(x) \quad (16)$$
$$b_n = B.(1+\cos ut).\cos(wt).f_2(x) \quad (17)$$

The modulation product of these potentials contains in addition to the direct current component $g$ a low frequency component as follows:

$$m = G.\cos(ut).F(x) \quad (18)$$

By demodulation of the low frequency component $m$ with the aid of the low frequency potential $k$ employed for the amplitude modulation, it is possible to obtain the following control magnitude or potential $G$ which is again responsive to small bearing deviations both as to sense and magnitude:

$$2m.\cos(ut) = G.F(x) + m_1 \quad (19)$$

The low frequency portion $m_1$ may be eliminated by a suitable smoothing filter thereby leaving a direct current component in accordance with Equation 4. Alternatively, in place of demodulating the low frequency $m$ which varies in proportion to the direction or angle $x$, the same may be applied to a watt meter type indicator such as a dynamometer which is furthermore energized by a current having a frequency equal to the auxiliary modulating frequency $k$.

A low frequency transmission is further enabled by modulating the modulation product or control potential $g$ in accordance with the low frequency $k$. The thus obtained low frequency current $m$ may be utilized in a manner similar as described hereinbefore.

In carrying out the mutual modulation of the directional signals $a$ and $b$ it is advisable to employ a symmetrical modulating circuit which is free from steady or quiescent current flow. The modulating system used should also be free from any rectifying effects so that the modulation product does not contain any direct current component if one of the directional signals becomes zero.

The control potential $g$ resulting from the modulation product of both signals $a$ and $b$ may also be generated without resorting to mutual modulation of the signals. Thus, if the first signal $a_n$ modulated according to a low frequency $k$, expression 16, after combination with the unchanged signal $b$ is rectified, there is obtained a low frequency potential as follows:

$$n = A.(1+\cos ut).f_1(x) + B.f_2(x) \quad (20)$$

From this low frequency a control potential can be derived by modulation with the original low frequency $k$ which control potential corresponds to the potential $g$.

The control magnitude may also be produced in the form of mechanical torque by feeding the signals $a$ and $b$ directly or after frequency changing ($a_v$ and $b_v$) to a watt meter device. A suitable device for this purpose may be constructed in the manner of a dynamometer wherein a coil energized by current from the first signal is rotatably mounted within the field produced by a coil energized by current derived from the second directional signal. In an arrangement of this type the mechanical torque between the two coils corresponds to the direct current component of the modulation product of the two applied currents, i. e. the control potential $g$ and may thus be utilized for direction finding in carrying out the method in accordance with the invention.

According to a further embodiment, a rotary field may be generated by the two directional currents after effecting a relative phase shift of 90° therebetween as represented by the following expressions:

$$a_d = A.\cos(w-v)t.f_1(x) \quad (21)$$
$$b_d = B.\sin(w-v)t.f_2(x) \quad (22)$$

The rotary field may be utilized in a known manner for operating a mechanically moving member such as by feeding an asynchronous motor by the currents $a_d$ and $b_d$. In this case the direction of rotation depends on whether the functions $f_1(x)$ and $f_2(x)$ are of like or opposite polarity. A change of polarity of $f_1(x)$ at the bearing minimum will result in the reversal of the sense of rotation while the number of revolutions of the motor will be proportional to small bearing deviations both as to sense and magnitude similar to the modulation product or control potential $g$. It is thus possible to control by the motor means for reducing or correcting the bearing deviations.

The antennae provided for receiving the directional signals may be fixed and the directional characteristic adjusted by the aid of an adjustable translation device such as is customary in directional receivers with goniometer adjustment. Furthermore, the known directional systems free from night effect errors may be employed for producing the directional receiving currents. In each case the average distance of the fixed or movable antennae from which the main and auxiliary receiving signals are derived should be small in relation to the wave length of the signals being received in order to avoid inadmissibly large phase rotations liable to interfere with the bearing indication and to produce substantial bearing errors. In most cases it is possible to mount the antenna systems coaxially and rotatably about a common axis or in fixed position when employing goniometer adjustment.

The control potential obtained by the new method according to the invention may be indicated by a suitable indicating instrument or it may serve for automatically adjusting the receiving antennae and/or control a steering device of a moving craft such as a ship, airplane, to automatically maintain the craft on a predetermined course as known in automatic pilot systems.

The advantages and novel features of the invention will become more apparent from the following detailed description of several practical embodiments thereof taken with reference to the accompanying drawings forming part of this specification and wherein:

Figure 1 is a diagram illustrating schematically a simple direction finding system constructed according to the invention, Figures 2 to 4 are modifications illustrating additional features of improvements and applications of the invention.

Similar reference characters identify similar elements and magnitudes throughout the different views of the drawings.

Referring more particularly to Figure 1, there are shown a pair of orthogonal loop antenna $R_1$ (main loop) and $R_2$ (auxiliary loop) which may be fixed or jointly rotatable about a common or separate axes. The high frequency signals $a$ and $b$ absorbed by the loops are amplified by the aid of amplifiers $V_1$ and $V_2$, respectively, and the amplified signals impressed upon a modulating device collectively indicated by the letter M. In the example illustrated this modulating device is constructed in the form of a balanced modulator comprising a pair of vacuum tubes 10 and 11 having at least a cathode, grid and an anode and arranged with the signal ($a$) from one loop impressed in phase opposition upon the grids of the tubes through an input transformer 12, and with the signal ($b$) derived from the other loop impressed in like phase position upon both grids of the tubes through input transformer 13. The anodes of the tubes are connected through coupling resistances 14 and 15, respectively, to the positive terminal of a suitable high tension source indicated by the + sign. There is thus obtained between the anodes of the tubes a voltage being a product function of the input potentials $a$, $b$ from which voltage by suitable filtering such as by the aid of series impedances 16 and 17 and a parallel capacity 18 there is derived a direct potential $g$ varying in accordance with small bearing deviations both in sense and magnitude as described in more detail hereinbefore. The potential $g$ serves to actuate a polarized direct current instrument Z preferably an instrument of the zero center type. If the two loops $R_1$ and $R_2$ are at right angle to each other, the deflections of the instrument according to Expression 4 will be characteristic of small deviations of the bearing adjustment relative to the direction of the incoming waves thus enabling the adjustment of a bearing minimum in a most efficient and easy manner. The bearing direction may be directly read on a scale cooperating with an indicator or pointer connected with the loops in a manner more fully described hereafter.

By temporarily rotating loop $R_2$ the loops may be brought to coincidence. In case of a bearing minimum of the signal $a$ received by the loop $R_1$, the signal $b$ will then also be zero; that is, the control potential $g$ according to Equation 4 will be zero. By such a test it is possible to ascertain whether there is actually a bearing minimum for the first (main) directional signal ($a$) in which case the direction of incidence of the received electromagnetic wave coincides with the axis or direction of minimum receptivity of the first loop. Accidental $\pm 90°$ ambiguities can be reliably resolved in this manner.

The control potential obtained by modulation may also serve for automatically maintaining the bearing minimum such as by the employment of a polarized relay P as shown in Figure 1 arranged to control a mechanical steering device St through a driving motor K. The latter in the example shown is started in one or the other direction by the relay P connecting and disconnecting the source of current B. If the direction finder is located upon a moving craft the steering device may be operatively connected with the steering or rudder control of the craft in such a manner that small deviations from this bearing minimum will cause a readjustment of the rudder tending to correct the initial deviation from the predetermined course.

In order to ensure a rapid correction in case of swiftly varying direction, it is advantageous to additionally control the steering device in accordance with the mathematical derivative of the controlling force or potential in such a manner that the control is dependent both upon the absolute value of the deviation as well as its rate of change from a desired course. In this manner an effective control takes place already upon the initiation of the deviation when the latter is still very small. The differential quotient or derivative of the controlling current is obtained by the provision of the condenser $C_5$ inserted in the connecting lead to the relay P while the control current itself is fed to the relay through an ohmic resistance $W_2$ in parallel to the condenser $C_5$.

There is further provided in Figure 1 an automatic volume control arrangement comprising a rectifier G for rectifying a portion of the signal $b$ to produce an AVC potential serving in a known manner to control the gain of the amplifiers $V_1$ and $V_2$ to maintain the amplitude of the signal $b$ substantially constant. In case of ideal operation of the AVC the amplified signal $b$ will be independent of the amplitudes of the received signal waves while the amplitude of the signal $a$ will be dependent solely upon the direction of the signals. In this case the modulation product or control potential $g$ has a fixed relation to the bearing deviations and the instrument Z may be calibrated to directly indicate the bearing deviations in angular degrees.

In Figure 2 there is shown a modified direction finding system according to the invention. The directional signals $a$ and $b$ are again received by a pair of orthogonal loops $R_1$ and $R_2$. The received signals are fed to amplifiers $V_1$ and $V_2$ and subsequently combined by the aid of a pair of mixers or frequency changers $N_1$ and $N_2$, respectively, with an auxiliary oscillation $h$ of local oscillator O to produce sum and difference frequencies in the output of the mixers. After subsequent amplification at intermediate frequency by means of amplifiers $V_3$ and $V_4$ the resulting difference frequencies $a_v$ and $b_v$ are impressed upon the modulating device M consisting in the example shown of a ring modulating system. The latter comprises four rectifiers 20 such as of the dry type arranged to form a Wheatstone bridge circuit with one of the input signals impressed upon one pair of opposite apices of the bridge and the other input signal being impressed upon the remaining apices of the bridge through input transformers 21 and 22, respectively. As explained hereinbefore with reference to expressions 14 and 15, the direct current component $g$ of the modulating product in the neighborhood of the bearing minimum varies as represented by Equation 4. The modulation product is derived from the center points of the transformer secondaries 21 and 22 and the control potential $g$ obtained after adequate filtering by the aid of series impedances 23, 24 and a shunt condenser 25 is fed to the indicator Z serving to indicate the deviations from zero bearing similar as in the case of Figure 1.

By actuating a polarized relay P the output potential $g$ may also serve for controlling a follow-up motor K which latter will be started in a forward or backward direction in dependence upon the polarity of the control potential $g$. The motor K serves to rotate the antenna system $R_1$, $R_2$ through a suitable transmission mechanism such as a worm gear drive T until reaching a bearing minimum for the loop $R_1$. This will result in a disappearance of the modulation product and a stopping of the operation of the motor through release of the relay P.

As pointed out above, an accidental bearing minimum of the second loop in certain cases may cause a bearing error of ±90°. Such bearing errors may be ascertained or resolved by individually indicating the signals $a_v$ and $b_v$ by means of additional indicators $Z_1$, $Z_2$ after rectification in rectifiers $G_1$ and $G_2$. In case of a correct adjustment $a_v$ will disappear while $b_v$ will be a maximum; that is, the deflection of $Z_1$ will be at a minimum and that of $Z_2$ at a maximum. In case of false adjustment on the other hand $b_v$ and in turn the deflection of $Z_2$ will be a minimum while $Z_1$ will have a maximum deflection.

The rectified signals may serve also as AVC potentials $r_1$ and $r_2$, respectively, fed to the amplifiers $V_1$ and $V_2$ to compensate amplitude variations of the received signals by controlling the amplifying gains. The bearing is indicated by the aid of a rotatable pointer connected to the shaft of the twin-loop antenna structure and cooperating with a suitable scale as shown at J in the drawing.

In place of rotatable loops $R_1$ and $R_2$ any known directional antennae may be employed at least one of which is characterized by a pronounced bearing minimum and phase reversal at the point of passing through this minimum. Thus, two parallel rods or conductors properly spaced from each other may take the place of a loop whereby the incoming signal currents are led from the lower ends of the conductors.

The determination of the bearing may be greatly simplified by temporarily employing an auxiliary or searching antenna for rough adjustment with reduced directional properties for receiving the auxiliary signal $b$. In this case the system will also be responsive to waves whose direction differs substantially from the adjustment of the directional antenna. For fine adjustment of the bearing minimum the directional sensitivity of the second antenna may be increased thereby avoiding errors caused by a laterally incoming interfering wave. The directional sensitivity of the second antenna may be varied by connecting and disconnecting antenna elements having different directional properties or by the addition of an auxiliary antenna. Thus for instance the figure-of-eight shaped directional characteristic of a loop may be converted in a known manner to a cardioid shaped characteristic by the addition of a non-directional antenna.

The invention may also be carried into effect by employing fixed antenna systems associated with adjustable translation means for rotating the directional characteristic such as illustrated in the examples shown in Figures 3 and 4.

Referring to Figure 3, items $A_1$ and $A_6$ represent fixed antennae connected to tap points of an annular impedance W in the example shown a toroidal induction coil with the tapping points relatively spaced by angular distances corresponding to the orientations of the respective antennae. A first receiving signal is derived from the coil W by means of a pair of diagonally arranged sliding contacts $S_1$ and $S_2$. In this manner it is possible to adjust a minimum of the first signal $a$ by rotating the contacts $S_1$ and $S_2$ without requiring any adjustment of the antennae $A_1$ to $A_6$. With the signal adjusted to a minimum, the connecting line between the contacts will point in the direction of the signal being received. A second signal $b$ is derived from the coil W through a pair of further sliding contacts $S_3$ and $S_4$ displaced relative to the contacts $S_1$ and $S_2$ by an angle of 90°. In this manner, the signal $b$ will assume a maximum when the signal $a$ passes through zero.

In order to obtain an alternating control potential, the received signals $a$ and $b$ are amplitude modulated in accordance with a low frequency potential $k$ generated by a local oscillator O and having a frequency $o$ to obtain modulated signals $a_n$ and $b_n$ in accordance with expressions 16 and 17. The amplitude modulation in the example shown is effected by the aid of electronic modulators $E_1$ and $E_2$ each comprising a plurality of grid electrodes with the incoming signal applied to one grid and the modulating signal impressed upon a different grid. The signals $a_n$ and $b_n$ varying according to the low frequency $k$ are amplified by means of amplifiers $V_1$ and $V_2$ and impressed upon the modulator M which may be of any known type such as shown in Figure 1 with the vacuum tubes replaced by dry rectifiers. The direct current component $g$ of the modulation product is transmitted through a low-pass filter L and applied to the indicating instrument Z while the low frequency component $m$ of the modulation product is passed through the high-pass filter H designed to pass the frequency $o$ to the first exciting coil $q_1$ to a dynamic relay Q. The second exciting coil $q_2$ of this relay is energized directly by the auxiliary frequency current $k$ from the oscillator O. The relay which may be constructed in the manner of a dynamometer will develop a torque having a direction depending upon the mutual phase position of the low frequency potentials $m$ and $k$ of like frequency. Since $m$ as shown in Equation 18 reverses its polarity simultaneously with small bearing deviations $x$ the deflection of the relay will be according to the sense of the bearing error. By the provision of current sources $B_1$ and $B_2$ controlled by the relay armature it is thus possible to operate a driving motor K in a corresponding sense and in turn rotate the sliding contacts $S_1$ to $S_4$ of the coil W in a direction so as to reduce the initial bearing deviation.

The employment of a low frequency control current $m$ is desirable if the current is to be transmitted through a line or if amplification is desired. In Figure 3 such an amplifier is shown at $V_5$.

In an arrangement shown in Figure 3 a 90° ambiguity may occur similar as in the case of Figure 2, the bearing minimum in this case being however unstable due to the fact that the signal $b$ disappears making the modulation product zero. In order to safely ascertain accidental false bearings there is shown a switch F for temporarily applying the signal $a_n$ to the second (lower) input of the modulator. In view of the product forming function of the modulator, there is thus produced in the modulator output a magnitude $a_n^2$ which is greater than zero if signal $a$ differs from zero. A false adjustment of the direction finder in which case the signal $a$ does not disappear will produce a corresponding deflection of the instrument Z in the test position of the switch F.

In Figure 4 there is illustrated an embodiment of the invention employing an antenna system of the Adcock type which is free from the effects of night error and consisting in a known manner of four single antennae $A_1$ to $A_4$ connected to ground through tuning condensers $C_1$ to $C_4$, respectively. The signals $a$ and $b$ are derived from a pair of crossed searching coils $Y_1$ and $Y_2$ cooperating with two sets of fixed coils at right angle to each other $X_1$, $X_2$, and $X_3$, $X_4$, respectively, and connected to the antenna wires to form a goniometer system of known type. As is understood, the antenna systems $A_1$, $A_2$ and $A_3$, $A_4$ are equivalent to the loops shown in the previous embodiments, but have the advantage of being responsive solely to the vertically polarized component of an incoming electromagnetic wave while being free from the disturbing influence of the horizontal component caused by rotation of the plane of the polarization of the sky-bound or down-coming wave normally causing substantial bearing errors in a closed loop antenna known as night effect.

The received signal $a$ may be adjusted to a minimum by rotating the searching coil system $Y_1$, $Y_2$. At the same time, the signal $b$ becomes a maximum due to the fact that the coils $Y_1$ and $Y_2$ are arranged at right angles to each other. After amplification in $V_1$ and $V_2$, the two signals are applied to the modulator M which may be of the balanced type comprising vacuum tubes with one signal impressed to one pair of corresponding grids of the tube in phase opposition and the other signal impressed upon a pair of corresponding different grids in like phase as indicated.

The control potential $g$ obtained as a result of the modulation may be indicated by means of an indicating instrument Z in a manner similar as described hereinbefore. In the example shown, the control potential $g$ also serves to operate a polarized relay P controlling the motor K which in turn serves to actuate the search coils $Y_1$, $Y_2$ through a transmission gear T. In this manner the search coils and the indicator Y will be adjusted to a stable bearing position as is understood from the foregoing. In place of an ordinary relay a regulating device having several adjusting steps may be provided for applying a driving force to the motor K varying both in polarity and magnitude in accordance with the instantaneous value of the control potential, ensuring a rapid regulating action in case of substantial bearing deviations.

The amplification in $V_1$ and $V_2$ may be controlled similar as in Figure 2 by means of AVC potentials $r_1$ and $r_2$, respectively, produced by the rectifiers and smoothing filters $G_1$ and $G_2$ to maintain the signal potential amplitudes $a$ and $b$ at substantially constant values. This AVC will result in an increase of the accuracy of the bearing adjustment by reason of the fact that the amplification of $V_1$ in the neighborhood of the minimum increases considerably due to the decrease of the signal $a$.

As explained with reference to Figure 2, the differential between both controlling potentials $r_1$ and $r_2$ may serve a control to ascertain whether a minimum of the first signal $a$ actually exists to eliminate the 90° ambiguity of the indication. The test may be carried out according to Figure 4 by indicating the differential potential between $r_1$ and $r_2$ by a special indicating instrument. The differential potential is fed through the resistance $W_6$ to a further potential indicator $Z_4$. Moreover, a further potential $r_3$ is derived from the center tap of $W_6$ and applied to a further indicating instrument $Z_3$ to indicate the average value of both regulating potentials for ascertaining the amplitude of the received radio signals.

The sense of the direction indication can also be controlled or ascertained by employing a further auxiliary antenna with a uni-lateral directional characteristic having only a single receiving minimum and connected to a receiving system. If the directional characteristic of this auxiliary (sense) antenna is rotated simultaneously with the adjustment of the direction finding system described, both devices in case of correct bearing adjustment should produce a simultaneous minimum. In this manner it is possible to resolve the 180° or sense ambiguity. A special auxiliary receiver may be avoided by temporarily applying the signal received by the sense antenna to the inputs of both receiving channels of the hereindescribed direction finding arrangement whereby rectification is effected by product formation between the applied signals of equal characteristics.

Although according to Equation 12 slight phase rotations produced in the receiving channels are in general without influence on the accuracy of the indication and/or control it is advisable to eliminate inherent phase shifts caused by the antenna systems or amplifying channels by the provision of suitable phase compensating means. In particular, unlike phase rotation in the two channels due to differences in the tuning systems may be avoided by employing ganged tuning elements for simultaneous tuning adjustment.

It will be evident from the above that the invention is susceptible to numerous embodiments in accordance with the general underlying principle such as a direct control of the steering or rudder mechanism of a moving craft to maintain the craft on a fixed predetermined course similar known automatic pilot systems. Accordingly, the invention is not limited to the specific embodiments and exemplifications shown herein for illustration, and it is understood that the latter are not to be interpreted in a sense of limiting the scope of the invention as defined by the appended claims.

I claim:

1. In a radio direction finder, a pair of directional antennae arranged so as to be excited in substantially like phase by an incoming radio signal and being oriented fixedly relative to each other so that a line of maximum receptivity of one antenna coincides with a line of minimum receptivity of the other antenna, and means for producing energy having an amplitude varying proportionally to the average product of the potentials developed in said antennae by an incoming radio signal.

2. In a radio direction finder, a first and a second directional antenna, said antennae being arranged so as to be excited at substantially like phase by an incoming radio signal and being oriented fixedly relative to each other so that a line of minimum receptivity of the first antenna coincides with a line of maximum receptivity of the second antenna, means for producing a pair of potentials proportional to the energies absorbed by said antennae from an incoming radio signal, means for producing control energy having an amplitude varying according to the product of said potentials, and further means including filter means for deriving from said control energy a component having an amplitude varying in proportion to deviations of the direction of propagation of said radio signal from the line of minimum receptivity of said first antenna.

3. In a radio direction finder, a first directional antenna having a polar directional characteristic with lines of maximum and zero receptivity, the polarity of a radio signal potential developed in said antenna being reversed when the signal direction passes through the zero bearing line of said antenna, a second directional antenna having a polar directional characteristic with lines of maximum and zero receptivity, said antennae being arranged so as to be excited in substantially like phase by an incoming radio signal and oriented fixedly relative to each other so that the direction of zero receptivity of the first antenna coincides with the direction of maximum receptivity of the second antenna, means for producing a pair of potentials proportional to the energies absorbed by said antennae from an incoming radio signal, means for producing from said potentials control energy having an amplitude varying proportionately to their product, and further means including filter means for deriving from said control energy a component varying in proportion to deviations of the direction of propagation of said radio signal from the line of zero receptivity of said first antenna.

4. In a radio direction finder, a pair of orthogonal loop antennae, means for producing a pair of potentials proportional to the energies absorbed by said loop antennae from an incoming radio signal, means for mutually intermodulating said potentials to produce resultant energy proportional to their product, and further means including filter means for deriving a component from said resultant energy having an amplitude varying in proportion to deviations of the direction of propagation of said radio signal from the line of zero receptivity of one of said antennae.

5. In a radio direction finder, a pair of coaxial orthogonal loop antennae, means for producing a pair of potentials proportional to the energies absorbed by said loop antennae from an incoming radio signal, means for mutually intermodulating said potentials to produce resultant energy proportional to their product, and further means including filter means for deriving a component from said resultant energy varying in proportion to deviations of the direction of propagation of said radio signal from the line of zero receptivity of one of said loop antennae.

6. In a radio direction finder, a first antenna having lines of maximum and zero receptivity, the polarity of a radio signal potential developed in said antenna being reversed when the signal direction passes through the zero bearing line of the antenna, a second directional antenna having lines of maximum and minimum receptivity, said antennae being arranged so as to be excited in substantially like phase by an incoming radio wave and oriented fixedly relative to each other so that the direction of zero receptivity of the first antenna coincides with the direction of maximum receptivity of the second antenna, means for producing a pair of potentials proportional to the energies absorbed by said antennae from an incoming radio signal, means for producing control energy having an amplitude proportional to the product of said potentials, further means including a smoothing filter for deriving from said control energy a component having an amplitude varying in proportion to deviations of the direction of propagation of said radio signal from the line of zero receptivity of said first antenna, and a zero center indicating instrument energized by said control energy.

7. In a radio direction finder, a first antenna having a polar directional characteristic with lines of maximum and zero receptivity, the polarity of a radio signal potential developed in said antenna being reversed when the signal direction passes through the zero bearing line of the antenna, a second directional antenna having a polar directional characteristic with lines of maximum and minimum receptivity, said antennae being arranged so as to be excited in substantially like phase by an incoming radio wave and oriented fixedly relative to each other so that the direction of zero receptivity of the first antenna coincides with the direction of maximum receptivity of the second antenna, means for producing a pair of potentials proportional to the energies absorbed by said antennae from an incoming radio signal, means for producing control energy having an amplitude proportional to the product of said potentials, further means including a smoothing filter for deriving from said control energy a component having an amplitude varying in proportion to deviations of the direction of propagation of said radio signal from the line of zero receptivity of said first antenna, and means responsive to said control potential for jointly rotating the directional polar characteristics of said antennae.

8. In a radio direction finder, a first directional antenna having a polar characteristic with lines of maximum and zero receptivity, the polarity of a radio signal potential developed in said antenna being reversed when the signal direction passes through the zero bearing line of said antenna, a second directional antenna having a polar characteristic with lines of maximum and minimum receptivity, said antennae being arranged so as to be excited in substantially like phase by an incoming radio wave and oriented fixedly relative to each other such that the line of zero receptivity of the first antenna coincides with the line of maximum receptivity of the second antenna, means for producing signal potentials proportional to the energies absorbed by said antennae from an incoming radio wave, a modulating device with means for applying thereto said potentials to produce electrical energy proportional to their product, means including filter means for segregating the direct current component from said electrical energy, and means for utilizing said direct current component to indicate the direction of propagation of said radio wave.

9. In a direction finder as claimed in claim 8 including separate amplifiers provided with gain control means and arranged between each of said antennae and said modulating device, means to produce a control potential from the signal received by the second antenna varying in proportion to the carrier average amplitude, and further means for applying said control potential to the gain control means of both said amplifiers.

10. In a direction finder as claimed in claim 8, including indicating means for comparing the relative magnitudes of said signal potentials.

11. In a direction finder as claimed in claim 8, including separate superheterodyne amplifying channels having a common local oscillator arranged between each of said antennae and said modulating device, and separate automatic gain control means associated with each amplifying channel to render said direct current component substantially independent of the strength of the radio wave being received.

12. In a direction finder as claimed in claim 8, including separate superheterodyne amplifying channels having a common local oscillator arranged between each of said antennae and said modulating device, separate automatic gain control means associated with each channel to render said direct current component substantially independent of the strength of the radio signal being received, and means responsive to said direct current component for jointly rotating the directional polar characteristics of said antennae in proportion to and in a direction depending on the polarity of said direct current component.

13. In a radio direction finder, a first directional antenna having a polar directional characteristic with lines of zero and maximum receptivity, the polarity of a radio signal potential developed in said antenna being reversed when the signal direction passes through the zero bearing line of said antenna, a second directional antenna having a polar directional characteristic with lines of maximum and minimum receptivity, said antennae being arranged so as to be excited in substantially like phase by an incoming radio wave and oriented fixedly relative to each other so that a line of zero receptivity of the first antenna coincides with a line of maximum receptivity of the second antenna, means for combining the energies absorbed by said antennae from an incoming radio signal with an auxiliary wave to produce beat frequency energies, modulating means for intermodulating potentials proportional to said beat frequency energies to produce resultant energy proportional to their product, means including filter means for deriving a control potential from said resultant energy having an amplitude varying in proportion to deviations of the direction of propagation of said electro-magnetic wave from the line of minimum receptivity of the first antenna, and means for utilizing said control potential for determining the direction of propagation of said radio wave.

14. In a radio direction finder, a pair of coaxial orthogonal loop antennae, separate amplifiers connected to said loop antennae, a modulating device having a pair of input circuits each energized by the output of one of said amplifiers to produce resultant energy varying in proportion to the product of the potentials developed in said loop antennae from energies absorbed from an incoming radio signal, means including a smoothing filter for segregating the direct current component from said resultant energy, and an indicator energized by said direct current component.

15. In a radio direction finder, a pair of coaxial orthogonal loop antennae, separate amplifiers connected to said loop antennae, a modulating device having a pair of input circuits each energized by an output of said amplifiers to produce resultant energy varying in proportion to the product of the potentials developed in said loop antennae from energies absorbed from an incoming electromagnetic wave, means including a smoothing filter for segregating the direct current component from said resultant energy, a polarized relay energized by said direct current component, a servo-motor controlled by said relay for jointly rotating said loops in directions depending upon the polarity of said control potential, and cooperating scale and index means operatively associated with said loops to indicate the bearing position thereof.

16. In a radio direction finder, an antenna system comprising a plurality of differently oriented pairs of spaced antenna elements arranged so that each two pairs are excited in substantially like phase by an incoming electromagnetic wave, a circular potential divider closed upon itself, connections from said pairs of antenna elements to diametrically opposite points on said potential divider angularly spaced like the corresponding pairs of antenna elements, two pairs of diametrically opposed contact members arranged for simultaneous rotation in sliding engagement with said potential divider, the connecting line between one pair of contact members being normal to the connecting line between the other pair of contact members, a modulating device for combining the potentials developed between each pair of contact members by an incoming electro-magnetic wave to produce resultant energy varying proportionately to the product of said potentials, means including filter means for segregating from said resultant energy a component varying in proportion and according to the sense of deviation of the direction of propagation of said electromagnetic wave from the connecting line between one of said pairs of contact members.

17. In a radio direction finder, an antenna system comprising a plurality of differently oriented pairs of antenna elements, a circular potential divider closed upon itself, connections from said pairs of antenna elements to diametrically opposite points on said potential divider angularly spaced like the corresponding pairs of antenna elements, two pairs of diametrically opposed contact members arranged for simultaneous rotation in sliding engagement with said potential divider, the connecting line between one pair of contact members being normal to the connecting line between the other pair of contact members, a modulating device for combining the potentials developed between each pair of contact members by an incoming electromagnetic wave to produce resultant energy varying proportionately to the product of said potentials, means including filter means for segregating from said resultant energy a control potential varying in proportion and according to the sense of deviation of the direction of propagation of said electro-magnetic wave from the connecting line between one of said pairs of contacts, a polarized relay energized by said control potential, and a servo-motor controlled by said relay for jointly rotating both said pairs of contact members in either direction depending on the sense of deviation of the direction of said electro-magnetic wave from a predetermined bearing position of said contact members.

18. In a radio direction finder, first directional antenna means having a polar directional pattern with lines of maximum and zero receptivity, the polarity of a signal potential developed in said antenna being reversed when the signal direction passes through the zero bearing line of said antenna means, second directional antenna means having a polar directional pattern with lines of maximum and minimum receptivity, said antennae means being arranged so as to be excited in substantially like phase by an incoming radio signal and being oriented fixedly relative to each other so that the direction of zero receptivity of the first antenna means coincides with the direction of maximum receptivity of the second antenna means, and means for producing energy proportional to the average product of the potentials developed in both said antennae means from an incoming radio signal, said energy varying in sense and magnitude proportionately to deviations of the direction of said radio signal from the line of zero receptivity of said first antenna means.

GUSTAV GUANELLA.